United States Patent Office 3,383,381
Patented May 14, 1968

3,383,381
FLUORO-AMINO CELLULOSE DERIVATIVES
James Macgregor Couper and Andrew Cochran Currie, Largs, Scotland, assignors, by mesne assignments, to the United States of America as represented by the Secretary of the Navy
No Drawing. Filed Feb. 19, 1965, Ser. No. 434,743
Claims priority, application Great Britain, Feb. 28, 1964, 8,519/64
12 Claims. (Cl. 260—212)

The present invention relates to new derivatives of dialdehyde cellulose containing difluoroamino groups, and the manufacture thereof.

Difluoroamino dialdehyde cellulose may be prepared as described in Zenftmen and Calder application Serial No. 284,744 filed May 31, 1963.

By the term "difluoramino dialdehyde cellulose" is meant cellulose which has been oxidised in such a manner and to such an extent that the

group in the 2 and 3 positions of at least a portion of the anhydroglucose units have been converted to aldehyde groups, thereby breaking the anhydroglucose rings, and subsequently at least a portion of the aldehyde groups have been converted to gem-bis(difluoramino) groups. The term also includes derivatives of such cellulose as, for example, esters or ethers in which difluoramino groups are present. Anhydroglucose units thus oxidised and difluoraminated are hereinafter termed "difluoramino dialdehyde cellulose units."

The practical limit for the number of difluoramino groups in a difluoramino dialdehyde cellulose unit, i.e. the Degree of Substitution, has been found to be two. Thus the aldehyde group in either the 2 or 3 position is left, either in the free state or masked by reaction with water, with residual hydroxyl groups of the cellulose, or with other aldehyde groups.

The new compounds of the present invention are reduced difluoramino dialdehyde cellulose and esters thereof which comprise in their molecular chain reduced difluoramino dialdehyde cellulose units. The fully difluoraminated form of these units may be represented by the formula:

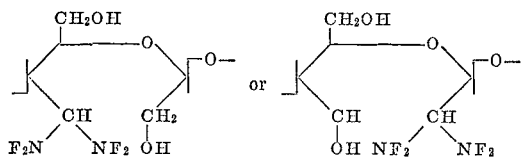

In the ester derivatives at least some of the free hydroxyl groups are esterified.

The compounds of the invention are useful energetic constituents of rocket propellents and when they contain an average of 0.5 or more difluoramino groups per difluoramino dialdehyde cellulose unit, they are themselves explosives. They are superior to difluoramino dialdehyde cellulose in their thermal stability, both alone and in admixture with other commonly used propellant ingredients.

In accordance with the invention, these new compounds are prepared by a process which comprises treating difluoramino dialdehyde cellulose with a reducing agent. The general reaction of a difluoramino dialdehyde cellulose having the difluoramino group on carbon atom 3 may be represented in the following manner:

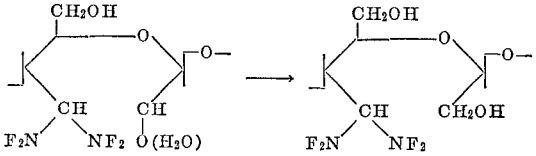

Aqueous sodium borohydride is a suitable reducing agent.

Difluoraminated compounds of the invention which contain free hydroxyl groups may be reacted with an acid to form esters. For example, by esterifying with nitric acid, compounds of higher energy content may be prepared.

If desired, the free hydroxyl group of the dialdehyde cellulose may be esterified, for example by nitration, before treatment with the reducing agent.

We have found a solution containing 3 volumes of 100% nitric acid and 5 volumes of methylene chloride (3:5 by volume) to be a convenient nitrating agent. Preferably the temperature should be controlled at about 0° C. during the nitration. A nitration time of 5 to 15 minutes is normally sufficient, after which time the nitration is preferably terminated by adding the reaction mixture to a large excess of ice-cold water to minimise decomposition of the product.

The invention is further illustrated by the following examples in which all parts and percentages are by weight.

EXAMPLE 1

A solution of 1.3 parts of sodium borohydride in 66 parts water cooled to 5° C. was added rapidly with stirring and icebath cooling to a suspension of 1.6 parts gem-bis(difluoramino) dialdehyde cellulose having a Degree of Substitution (D.S.) of 1.7 difluoramino groups per anhydroglucose units in 100 parts water. A vigorous reaction ensued, with much foaming. After 5 hours a further 1.3 parts of sodium borohydride were added, the solution stirred for one hour and filtered carefully. The product was washed with water and dried to give 1 part of a white, fibrous material which was shown by analysis to contain 24.6% fluorine and 9.0% nitrogen. This analysis was in reasonable agreement with that of reduced gem-bis(difluoramino) dialdehyde cellulose having a Degree of Substitution of 1.5, which requires 24.9% fluorine and 9.2% nitrogen.

This reduced gem-bis(difluoramino)dialdehyde cellulose was found to have an explosion point of 116° C. When ignited it flashed with a bright white flame. It failed to ignite when a ½ kg. mild steel hammer was dropped from a height of 10 cm. on to a thin layer of the material on a mild steel anvil, but ignited at a height of 20 cm. The material was found to be stable when mixed with the following ingredients under the conditions specified:

(i) With aluminium powder and ammonium perchlorate when heated together at 100° C. for 1 hour;
  (ii) With mechanically nitrated nitrocellulose containing 12.6% nitrogen maintained at 70° C. for 1 hour;
  (iii) With aluminium and ammonium perchlorate and 2:1 alcohol:acetone solvent at room temperature for 1 hour;
  (iv) With aluminium and ammonium perchlorate moistened with water and kept at room temperature for 1 hour;

(v) With aluminium, ammonium perchlorate, mechanically nitrated nitrocellulose containing 12.6% nitrogen, water, 2:1 alcohol:acetone, solvent, and casing liquid (nitroglycerine, triacetin, 2-nitrodiphenylamine, 80:19:1) when stored at 70° C. for 2 weeks.

There was no change in the nitrogen and fluorine content of a sample which was stored for 4 months.

The heat of formation of reduced gem-bis(difluoramino) dialdehyde cellulose is estimated to be −179.2 Kcal./mol by the method described in Industrial and Engineering Chemistry, vol. 4 (1949), 1070. The heat of formation of gem-bis(difluoramino)dialdehyde cellulose is estimated by this method to be −166 Kcal./mol.

EXAMPLE 2

1 part of the reduced gem-bis(difluoramino)dialdehyde cellulose (D.S. 1.5) prepared in Example 1 was added slowly in small quantities to a stirred solution of 9 parts 100% nitric acid in 13 parts methylene chloride at 0° C., and stirring was continued for five minutes. The product was isolated by pouring the reaction mixture into excess ice and water and filtering off the solid material. Washing with water and drying gave 1.3 parts of a white fibrous material which was shown by analysis to contain 16.5% fluorine and 8.8% nitrogen. Dinitrato gem-bis(difluoramino) dialdehyde cellulose

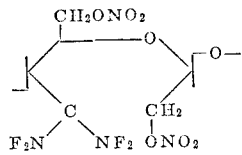

with a difluoramino Degree of Substitution of 1.0, and a nitrato Degree of Substitution of 0.4 requires 16.5% fluorine and 8.8% nitrogen.

A sample of the reduced and nitrated gem-bis(difluoramino)dialdehyde cellulose was found to have an explosion point of 112° C. When ignited it flashed with a bright white flame. It failed to ignite when a ½ kg. mild steel hammer was dropped from a height of 40 cm. on to a thin layer of the material on a mild steel anvil, but ignited at a height of 50 cm. The heat of formation of dinitrato gem-bis(difluoramino)dialdehyde cellulose is estimated by the above method to be −132.2 Kcal./mol.

EXAMPLE 3

Nitrato-gem-bis(difluoramino)dialdehyde cellulose

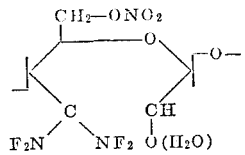

as used in this example was prepared by the action of difluoramine and sulphuric acid on dialdehyde cellulose which had been previously nitrated with a mixture of 100% nitric acid and phosphorus pentoxide.

A solution of 2.6 parts sodium borohydride in 133 parts water cooled to 5° C. was added rapidly with stirring and ice-bath cooling to a suspension of 3 parts nitrato-gem-bis(difluoramino)dialdehyde cellulose (with a difluoramino Degree of Substitution of 1.1 and a nitrato Degree of Substitution of 0.4) in 166 parts water. Stirring was continued for 5 hours at 0° C. and the product then filtered off, washed with water and dried to give 1 part white fluffy material which was shown by analysis to contain 13.9% fluorine and 8.29% nitrogen. Mononitrato reduced gem-bis(difluoramino)dialdehyde cellulose

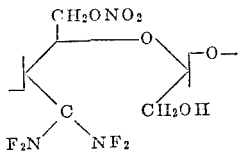

with a difluoramino Degree of Substitution of 0.7, and a nitrato Degree of Substitution of 0.2, requires 13.9% fluorine and 8.2% nitrogen. When ignited the product flashed with a bright white flame.

1 part of the mononitrato reduced gem-bis(difluoramino)dialdehyde cellulose was slowly added to a stirred mixture of 43 parts methylene chloride and 30 parts 100% nitric acid at 0° C. The mixture was stirred for 5 minutes, poured on to excess ice and water and filtered to give, after drying over phosphorus pentoxide, 0.5 part of a white solid which was shown by analysis to contain 10.1% fluorine and 2.4% nitrogen.

What we claim is:

1. A difluoraminated cellulose derivative comprising in its molecular chain reduced difluoramino dialdehyde cellulose units of the formula

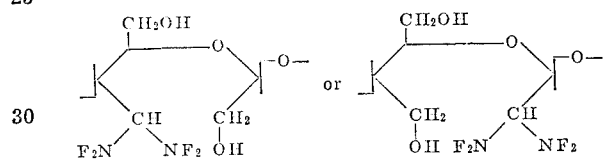

and nitrates thereof.

2. Reduced gem-bis(difluoramino)dialdehyde cellulose.
3. Mononitrato-reduced gem-bis(difluoramino)dialdehyde cellulose.
4. Dinitrato-gem-bis(difluoramino)dialdehyde cellulose.
5. Hydroxy difluoramino dialdehyde cellulose and nitrates thereof.
6. A process for the preparation of hydroxy difluoramino dialdehyde cellulose and nitrates thereof wherein a compound selected from the group consisting of difluoramino dialdehyde cellulose and nitrates thereof is chemically reduced.
7. A process as in claim 6 wherein the compound is reduced with sodium borohydrate.
8. A process as claimed in claim 6 wherein a nitric acid ester of difluoramino dialdehyde cellulose is treated with a reducing agent.
9. A process as claimed in claim 8 wherein the nitric acid ester of difluoramino dialdehyde cellulose is formed by treating difluoramino dialdehyde cellulose with a solution of nitric acid in methylene chloride.
10. A process as claimed in claim 6 wherein the hydroxy difluoramino dialdehyde cellulose is first formed and is converted to an ester by treatment with a nitrate.
11. A process as claimed in claim 10 wherein the nitrating agent is a solution of nitric acid in methylene chloride.
12. A process as claimed in claim 9 wherein the nitration is terminated by mixing the reaction medium with a large excess of ice cold water.

No references cited.

DONALD E. CZAJA, Primary Examiner.

R. W. MULCAHY, Assistant Examiner.